United States Patent
Gage et al.

(10) Patent No.: US 10,093,253 B2
(45) Date of Patent: Oct. 9, 2018

(54) SYSTEMS AND METHODS FOR NOTIFYING A USER ABOUT A TEMPERATURE CONDITION AFTER A LAPSE OF A REMOTE START BASED ON ESTIMATED TEMPERATURE

(71) Applicant: Toyota Motor Engineering & Manufacturing North America, Inc., Erlanger, KY (US)

(72) Inventors: Sergei Gage, Redford, MI (US); Arata Sato, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 90 days.

(21) Appl. No.: 15/424,151

(22) Filed: Feb. 3, 2017

(65) Prior Publication Data

US 2018/0148008 A1    May 31, 2018

Related U.S. Application Data

(60) Provisional application No. 62/428,236, filed on Nov. 30, 2016.

(51) Int. Cl.
   *B60R 16/037* (2006.01)
   *B60R 25/20* (2013.01)
   *G07C 5/00* (2006.01)

(52) U.S. Cl.
   CPC .......... *B60R 16/037* (2013.01); *B60R 25/209* (2013.01); *G07C 5/008* (2013.01); *B60R 2325/205* (2013.01)

(58) Field of Classification Search
   CPC ............... B60R 16/037; B60R 25/209; B60R 2325/205; G07C 5/008
   (Continued)

(56) References Cited

U.S. PATENT DOCUMENTS 6,768,420 B2   7/2004  McCarthy et al.
6,922,147 B1   7/2005  Viksnins et al.
(Continued)

FOREIGN PATENT DOCUMENTS

CA    2698162 A1    3/2009
WO    2014128273 A1    8/2014
WO    2015047161 A1    4/2015

OTHER PUBLICATIONS

"Remote start system", Date of access: Jul. 20, 2016, URL: owner.ford.com/how-tos/vehicle-features/locks-and-security/remote-start-system.html.
(Continued)

*Primary Examiner* — Yazan A Soofi
(74) *Attorney, Agent, or Firm* — Dinsmore & Shohl LLP

(57) ABSTRACT

A system and method for notifying a user about a temperature condition of a passenger compartment of a vehicle after a lapse of a remote start of a drive system of the vehicle. The system and method include retrieving a weather forecast for an area in which the vehicle is located and estimating a future temperature of the passenger compartment in response to a remote start request. The future temperature of the passenger compartment is a temperature of the passenger compartment after a lapse of a predetermined runtime. In response to determining that the estimated future temperature is outside of the predetermined temperature range a notice is sent to a computing device.

20 Claims, 7 Drawing Sheets

(58) Field of Classification Search
USPC .............................................................. 701/2
See application file for complete search history.

(56) References Cited

U.S. PATENT DOCUMENTS

| | | | |
|---|---|---|---|
| 7,218,211 | B2 | 5/2007 | Ho et al. |
| 7,542,827 | B2 | 6/2009 | Gerard et al. |
| 8,096,482 | B2 | 1/2012 | Dage |
| 8,212,665 | B2 | 7/2012 | Schoenberg et al. |
| 8,489,085 | B2 | 7/2013 | Simmons |
| 8,768,292 | B2 | 7/2014 | Welch |
| 8,972,152 | B2 | 3/2015 | Boesch |
| 9,014,920 | B1 | 4/2015 | Torres et al. |
| 9,227,483 | B2 | 1/2016 | Kalhous et al. |
| 2002/0161501 | A1* | 10/2002 | Dulin .................... B06B 1/0215 701/45 |
| 2004/0113797 | A1* | 6/2004 | Osborne ................ B60N 2/002 340/573.4 |
| 2012/0242476 | A1 | 9/2012 | Schoenberg et al. |
| 2016/0047348 | A1 | 2/2016 | Bauerle |
| 2018/0072152 | A1* | 3/2018 | Dudar .............. B60K 15/03504 |
| 2018/0072556 | A1* | 3/2018 | Dudar .................... B67D 7/145 |

OTHER PUBLICATIONS

"Automatic/manual transmission remote starter", Published: Mar. 2016, URL: www.solaceremotestarters.com/manual_request.php?m=0.

"Start and control your car with your smartphone", Date of access: Jul. 20, 2016, URL: www.astrostart.com/SmartStart/Features/.

"DroneMobile", Date of access: Jul. 20, 2016, URL: www.dronemobile.com/how-it-works.html.

U.S. Appl. No. 15/090,975, filed Apr. 5, 2016, Inventor: Kenan Kurtovic.

* cited by examiner

SYSTEMS AND METHODS FOR NOTIFYING A USER ABOUT A TEMPERATURE CONDITION AFTER A LAPSE OF A REMOTE START BASED ON ESTIMATED TEMPERATURE

CROSS REFERENCE TO RELATED APPLICATION(S)

This application claims the benefit of U.S. Provisional Application No. 62/428,236 filed Nov. 30, 2016, the entire contents of which are hereby incorporated by reference.

TECHNICAL FIELD

The present specification generally relates to systems and methods for notifying a user about a temperature condition and, more specifically, systems and methods for notifying a user about a temperature of a passenger compartment of a vehicle after a lapse of a remote start of a drive system of the vehicle based on an estimated future temperature of the passenger compartment of the vehicle.

BACKGROUND

There are currently remote start systems that allow a user to remotely start a drive system of a vehicle in which the drive system will run for a predetermined time. Further, the known remote start systems allow the user to request temperature information for the passenger compartment of the vehicle and allow the user to extend the predetermined time. However, the previously known remote start systems only provide a current actual temperature of the passenger compartment of the vehicle.

Such systems have proven useful for allowing the user to check whether the current actual temperature of the passenger compartment is within a desired temperature range. However, the user may be unaware that after the lapse of the predetermined time the temperature is outside of the desired temperature range. For example, the user is not automatically notified of at the time of remote start that the predetermined time is insufficient to provide the temperature of the passenger compartment within the desired temperature range. Therefore, the user may fail to realize that the predetermined time would need to be extended prior to the expiration of the predetermined time.

Accordingly, a need exists for alternative systems and methods for notifying a user about a temperature of a passenger compartment of a vehicle after a lapse of a remote start of a drive system of the vehicle based on an estimated future temperature of the passenger compartment of the vehicle.

SUMMARY

In one embodiment a system for notifying a user about a temperature condition of a passenger compartment of a vehicle after a lapse of a remote start runtime of a drive system of the vehicle includes a computing device, a transceiver, a temperature sensor, and an electronic control unit. The computing device sends a remote start request to the vehicle to start the drive system. The transceiver receives the remote start request and retrieves a weather forecast for an area in which the vehicle is located. The temperature sensor detects a temperature of the vehicle. The electronic control unit includes a processor and a memory unit that is coupled to the processor. The memory unit stores logic that, when executed by the processor, causes the electronic control unit to start the drive system of the vehicle for a predetermined runtime upon receipt of the remote start request from the computing device. The electronic control unit also estimates a future temperature of the passenger compartment based on the detected temperature of the vehicle and the retrieved weather forecast for the area in which the vehicle is located. The estimated future temperature of the passenger compartment is a temperature of the passenger compartment after a lapse of the predetermined runtime. The electronic control unit further determines whether the estimated future temperature is outside of a predetermined temperature range. In response to determining that the estimated future temperature is outside of the predetermined temperature range, a notice is sent to the computing device. The notice indicating the estimated future temperature of the passenger compartment after the lapse of the predetermined runtime.

In another embodiment, a method for notifying a user about a temperature condition of a passenger compartment of a vehicle after a lapse of a remote start of a drive system of the vehicle includes determining whether a remote start request from a computing device is received. In response to determining that the remote start request has been received, start the drive system of the vehicle for a predetermined runtime, retrieve a weather forecast, and estimate a future temperature of the passenger compartment. The weather forecast is for an area in which the vehicle is located. The future temperature of the passenger compartment is estimated based on a vehicle temperature detected by a temperature sensor and the retrieved weather forecast for the area in which the vehicle is located. The future temperature of the passenger compartment is a temperature of the passenger compartment after a lapse of the predetermined runtime. The method further includes determining whether the estimated future temperature is outside of a predetermined temperature range. In response to determining that the estimated future temperature is outside of the predetermined temperature range, the method displays a notice on the computing device. The notice displays the estimated future temperature of the passenger compartment after the lapse of the predetermined runtime.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
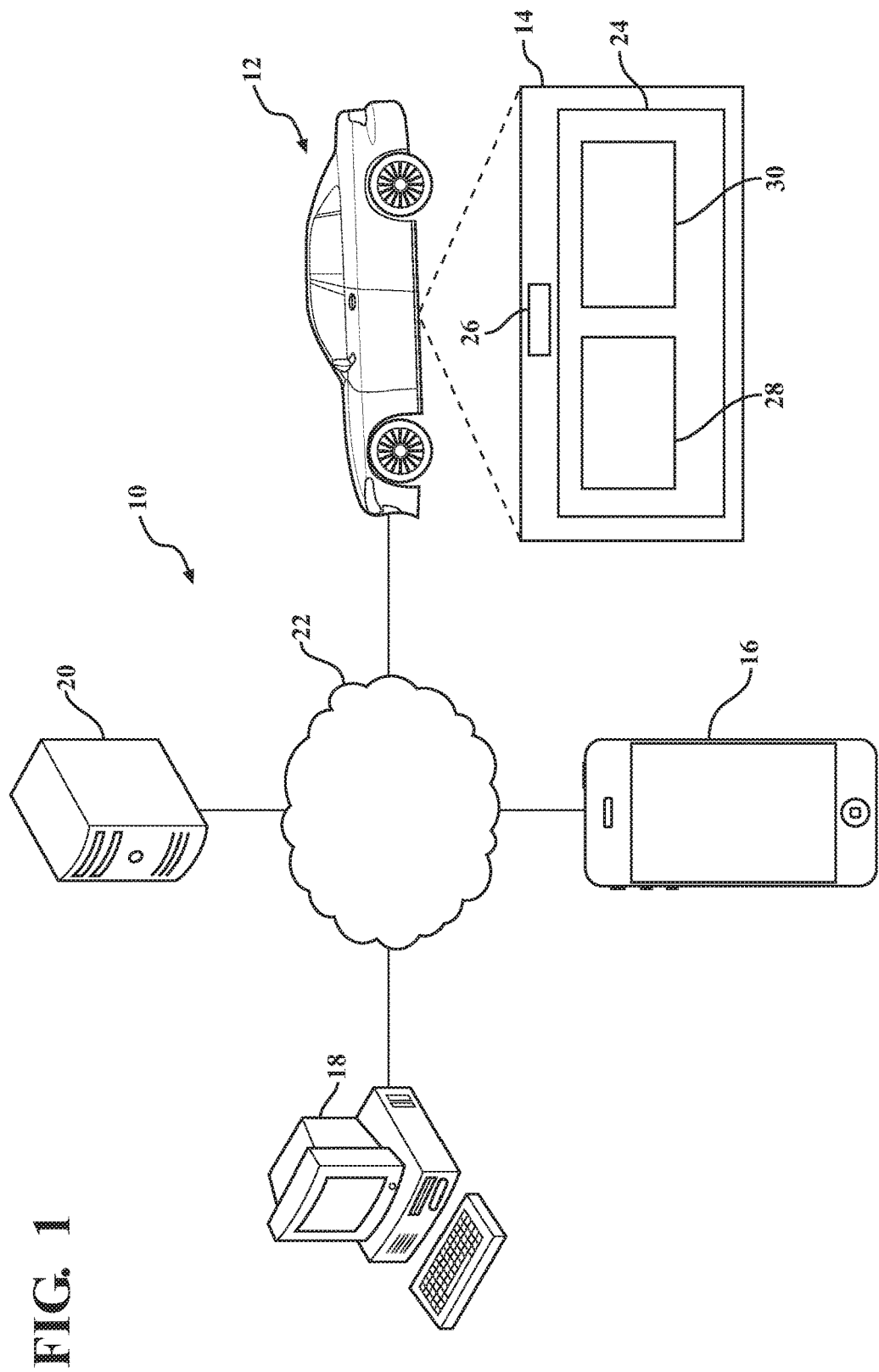
FIG. 1 schematically depicts an environment for notifying a user about a temperature condition after a lapse of a predetermined runtime of the drive system based upon an estimated future temperature, according to one or more embodiments shown and described herein.

FIG. 1 generally depicts an embodiment of a system for notifying a user about a temperature condition of a passenger compartment of a vehicle after a lapse of a remote start of a drive system of the vehicle. The system generally comprises a vehicle that includes an onboard computing device, a computing device, an administrator computing device, and a weather data service. The onboard computing device is in communication with the computing device, the administrator computing device, and the weather data service through a network. Various embodiments of the systems and the operation of methods of notifying a user about a temperature condition will be described in more detail herein.

Embodiments disclosed herein include systems and methods for notifying a user about a temperature condition of a passenger compartment of a vehicle after a lapse of a remote start of a drive system of the vehicle. Some embodiments include hardware and/or software for determining whether a drive system of the vehicle has been started in response to a remote start request, and whether an estimated future temperature will be outside of a predetermined temperature range. Specifically, the embodiments disclosed herein may be configured to estimate a future temperature of the passenger compartment of the vehicle as a temperature after a lapse of a plurality of predetermined runtimes.

In some embodiments, the systems and methods issue a notice to a user that the estimated future temperature of the passenger compartment will be outside a predetermined temperature range prior to the lapse of the predetermined runtime. Specifically, the systems and methods estimate a future temperature of the passenger compartment of the vehicle based on local weather forecasts for the area in which the vehicle is located. As such, the user, such as a driver, can be notified about a temperature of the passenger compartment being outside of a predetermined temperature range in advance of the lapse of the predetermined runtime.

In some embodiments, when it is determined that a future temperature is outside of the predetermined temperature range, a notice is sent to a user, such as a driver. The notice indicates that the temperature of the vehicle compartment is estimated to be outside the predetermined temperature range after the lapse of the predetermined runtime. Some embodiments may be configured to provide a signal to a computing device, such as a mobile computing device including a mobile telephone, Personal Digital Assistant (PDA), tablet, or key fob. The notice provides an option to modify the predetermined runtime that the drive system will operate from the receipt of the remote start request. The option is initiated through the computing device to prevent the temperature from being outside of the of the predetermined temperature range at the lapse of the predetermined runtime.

Referring now to the drawings, FIG. 1 schematically depicts an environment of a system for notifying a user about a temperature condition. As illustrated, the system 10 includes a vehicle 12 having an onboard computing device 14, a mobile computing device 16, an administrator computing device 18, and a weather data service 20. In some embodiments, a network 22 couples the vehicle 12, the mobile computing device 16, the administrator computing device 18, and the weather data service 20. In some embodiments the network 22 may include a wide area network, such as an internet or cellular network (such as 3G, 4G, 4G LTE, WiMAX, etc.). Similarly, the network 22 may include a local area network, such as a wireless fidelity (Wi-Fi) network, a Bluetooth network, a near field communication network, hardware, and the like.

As depicted in FIG. 1, the onboard computing device 14 of the vehicle 12 includes an electronic control unit 24 and a transceiver 26. The electronic control unit 24 includes a processor 28 and a memory component 30 coupled to the processor 28. The transceiver 26 is in electrical communication with the electronic control unit 24 and is connected to the network 22 to couple the vehicle 12 to the network 22.

The mobile computing device 16 may be configured as a mobile phone, a tablet, a personal computer, key fob, and/or other devices for performing the functionality described herein. The mobile computing device 16 may be operated by a user such as a driver or other occupant or owner of the vehicle 12. Similarly, the administrator computing device 18 may be configured as a personal computer, tablet, mobile telephone, key fob etc., and operated by an administrative authority that is situated for assisting in the management of a fleet of vehicles. Alternatively, the administrator computing device 18 may be operated by an administrator that is situated for assisting in emergency situations including first responders, police departments, fire departments, 911 service, Emergency Medical Technicians, or other local authorities.

Figure 2:
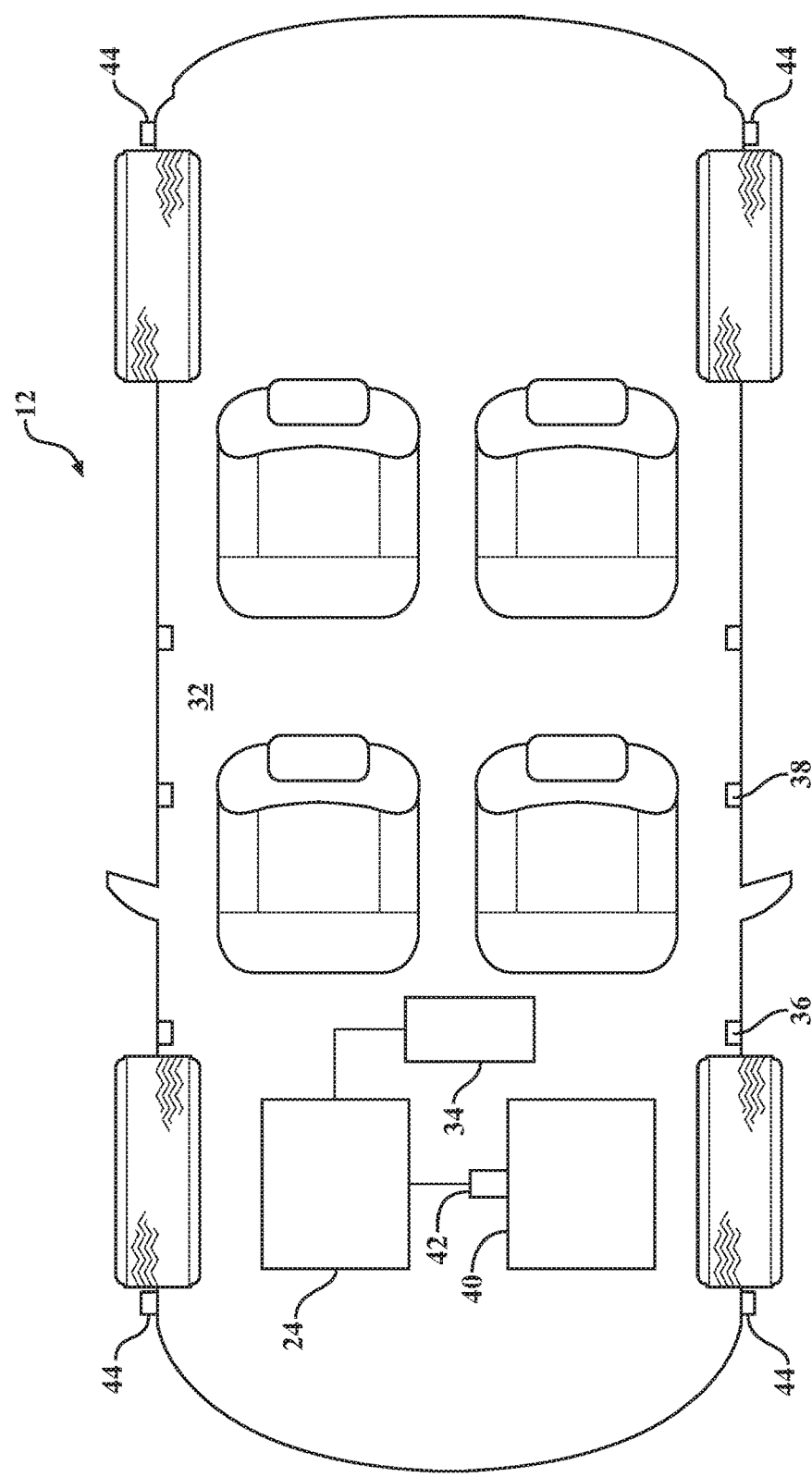
FIG. 2 schematically depicts a vehicle interior which includes a plurality of sensors, according to one or more embodiments shown and described herein.

FIG. 2 schematically depicts an interior of the vehicle 12. Specifically, the vehicle 12 includes a passenger compartment 32 provided in an interior thereof. The passenger compartment 32 is a portion of an interior of the vehicle 12 which passengers or other occupants occupy.

The vehicle 12 includes an HVAC (heating, ventilation and air conditioning) system 34 which is coupled to the electronic control unit 24. The HVAC system 34 is controlled by the electronic control unit 24 to regulate an internal temperature of the passenger compartment 32 during a remote start. The HVAC system 34 includes a heater unit, an air conditioner unit, electronically controlled front and rear windshield defrosters, and a vent system for directing the heated or cooled air from the heater unit and the air conditioner unit, respectively.

The vehicle 12 includes an external temperature sensor 36 and an internal temperature sensor 38. The external temperature sensor 36 is provided on an exterior of the vehicle and detects an external temperature of the vehicle 12. The internal temperature sensor 38 is provided in the passenger compartment 32 and detects the internal temperature of the passenger compartment 32.

The vehicle includes a drive system 40 in communication with the electronic control unit 24 as shown in FIG. 2. The drive system 40 optionally includes a number of different types of drive systems, including an internal combustion engine utilizing gasoline, diesel, a mixed gasoline and ethanol fuel, compressed gaseous fuel (natural gas, propane, hydrogen, etc). The drive system 40 optionally includes an internal combustion and electric motor/generator hybrid engine, an electric motor/generator, or any combination thereof.

The drive system 40 is remotely started upon actuation of the mobile computing device 16 to request a remote start of the drive system 40. The mobile computing device 16, or optionally the administrator computing device 18, sends a remote start request. The remote start request is received by the transceiver 26 of the onboard computing device 14 and is implemented by the electronic control unit 24 to start the drive system 40. Specifically, the electronic control unit 24 controls the drive system 40 to initiate starting operation of the drive system 40. Upon starting of operation of the drive system 40, the electronic control unit 24 controls the HVAC system 34 to operate to control the temperature of the passenger compartment 32 to be within the predetermined temperature range.

The vehicle 12 further includes a drive system temperature sensor 42. The drive system temperature sensor 42 detects a temperature of the drive system 40. The temperature of the drive system 40 detected by the drive system temperature sensor 42 is used to determine whether the drive system 40 has reached a temperature threshold.

In some embodiments, the drive system temperature sensor 42 is optionally an internal combustion engine temperature sensor that detects the temperature of an operating condition of the internal combustion engine. For example, the drive system temperature sensor 42 detects the temperature of engine coolant, engine oil temperature sensor, exhaust gas, or exhaust catalyst to detect an operating temperature of the drive system 40. In some embodiments, the drive system temperature sensor 42 is optionally detects an operating temperature of the motor/generator or the battery of the electric or hybrid drive system 40.

A plurality of environmental condition sensors 44 are provided on the exterior of the vehicle 12. The environmental condition sensors 44 are in communication with the electronic control unit 24. The environmental condition sensors 44 detect an environmental condition. In some embodiments, the environmental condition sensors 44 include sun load sensors and/or rain sensors. The sun load sensors determine the amount of sun light that is exposed to the vehicle 12. Specifically, the sun sensors issue a signal to the electronic control unit 24 corresponding to the amount of sun light that is received by the vehicle 12.

The rain sensors determine the presence or absence of precipitation that is exposed to the vehicle 12. Specifically, the rain sensors issue a signal to the electronic control unit 24 corresponding to the amount of precipitation that is received by the vehicle 12. In some embodiments, the rain sensor is provided as a sensor used in an automatic windshield wiping system that automates the windshield wipers when precipitation is detected.

Figure 3:
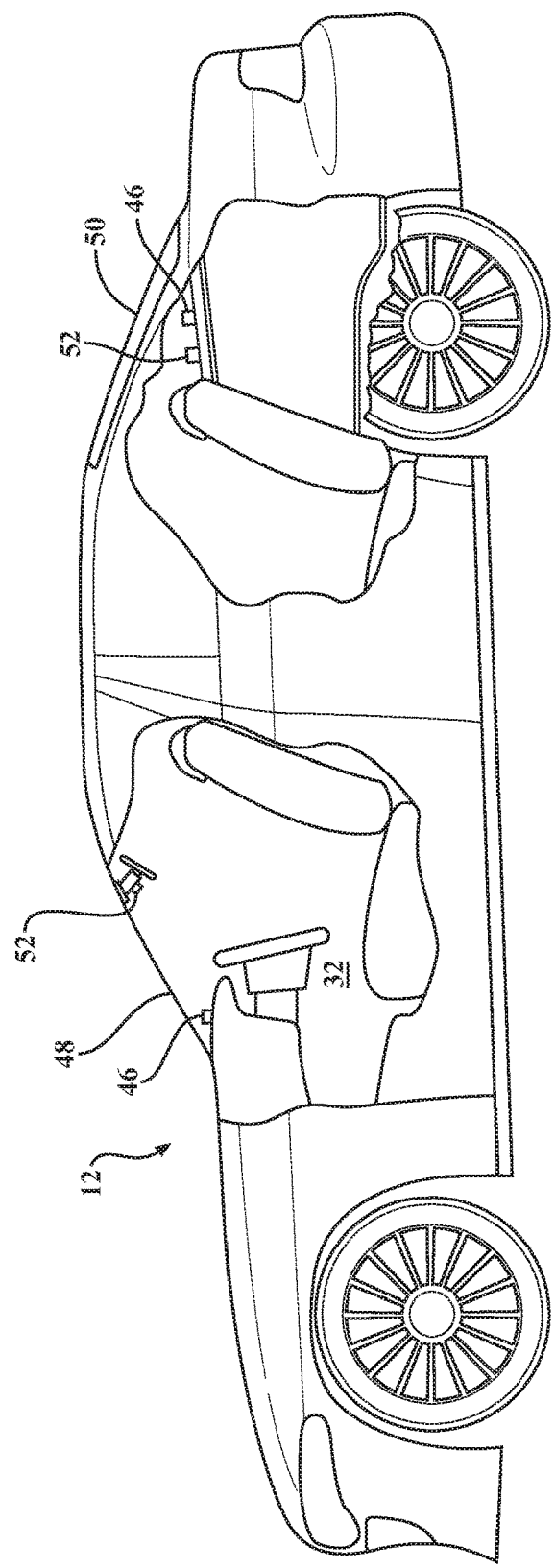
FIG. 3 schematically depicts partially depicts a side view of the vehicle, according to one or more embodiments shown and described herein.

With reference to FIG. 3, sun load sensors 46 are provided in the passenger compartment 32. In some embodiments, the sun load sensors 46 are provided on an instrument panel or a rear platform of the vehicle 12, as shown in FIG. 3. The sun load sensors 46 are positioned adjacent a front windshield 48 and a rear windshield 50 such that light entering through the front windshield 48 or the rear windshield 50 is sensed by the sun load sensors 46.

In some embodiments an imaging device 52, such as camera, is provide in the passenger compartment 32, as shown in FIG. 3. The imaging device 52 is positioned so as to capture an image of the front windshield 48 or the rear windshield 50. In some embodiments, the imaging device 52 is optionally provided on a rearview mirror or a rear platform panel of the vehicle 12, as shown in FIG. 3.

The sun load sensors 46 and/or the imaging device 52 operate as blockage sensors that output a signal indicating a state of blockage of the front windshield 48 or the rear windshield 50. As described in greater detail below, the blockage sensor outputs a signal indicating a blockage amount of the front windshield 48 or the rear windshield 50. The blockage amount is used to determine a state of blockage of the front windshield 48 or the rear windshield 50. For example, the amount of snow or ice covering the front windshield 48 or the rear windshield 50.

Figure 4:
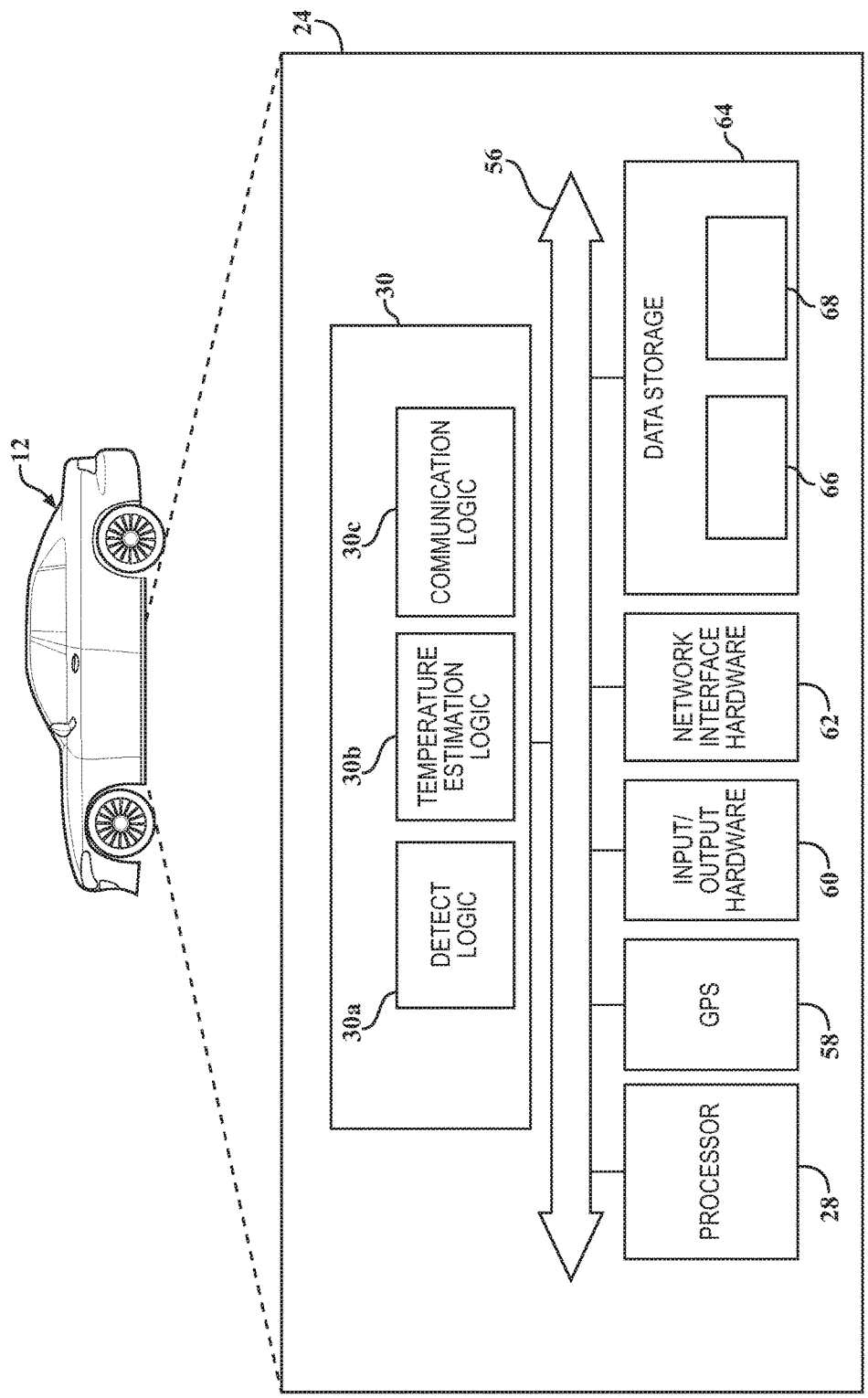
FIG. 4 schematically depicts a system for notifying a user about a temperature condition after a lapse of a predetermined runtime of a drive system based upon an estimated future temperature, according to one or more embodiments described herein.

With reference to FIG. 4, the electronic control unit 24 of the onboard computing device 14 is discussed in greater detail. The electronic control unit 24 includes the processor 28, the memory component 30, a local interface 56, a global positioning system (GPS) 58, an input/output hardware 60, a network interface hardware 62, and a data storage component 64. The data storage component 64 stores temperature map data 66, and environmental conditions data 68. The memory component 30 and the data storage component 64 operate as the memory unit of the electronic control unit 24.

In some embodiments the processor 28 includes processing components operable to receive and execute instructions (such as from a data storage component 64 and/or the memory component 30).

The memory component 30 stores detection logic 30a, temperature estimation logic 30b, and communication logic 30c. The detection logic 30a, temperature estimation logic 30b, and the communication logic 30c may each include a plurality of different pieces of logic, each of which may be embodied as a computer program, firmware, and/or software/hardware.

The detection logic 30a is executable by the processor 28 to detect one or more signals from the sensors provided in the vehicle 12. For example, the detection logic 30a is configured to cause the processor 28 to detect the external temperature from the external temperature sensor 36, the internal temperature from the internal temperature sensor 38, the drive system temperature from the drive system temperature sensor 42, the environmental conditions from the environmental conditions sensors 44, the state of blockage from the sun load sensors 46 and the imaging device 52. The detection logic 30a is further configured to cause the processor 28 to determine whether a state of blockage of the front windshield 48 or the rear windshield 50 is less than a predetermined value, and whether the estimated future temperature of the passenger compartment 32 is outside of a predetermined temperature range.

The temperature estimation logic 30b is executable by the processor 28 to estimate a future temperature of the passenger compartment 32 based on the temperature of the vehicle, the weather data from the weather data service 20 using the temperature map data 66. The temperature of the vehicle is a temperature from at least one of the external temperature from the external temperature sensor 36, the internal temperature from the internal temperature sensor 38, and/or the drive system temperature from the drive system temperature sensor 42. The temperature estimation logic 30b is executable by the processor 28 to correct the estimated future temperature of the passenger compartment 32 based using the output from the environmental condition sensors 44 and the environmental conditions data 68. The future temperature is a temperature of the passenger compartment 32 after the lapse of the predetermined runtime.

The communication logic 30c is executable by the processor 28 to cause the onboard computing device 14 to communicate with the network 22 through the network interface hardware 62 and/or the transceiver 26 to communicate with the mobile computing device 16, administrator computing device 18, and the weather data service 20.

In some embodiments, the memory component 30 is configured as volatile and/or nonvolatile memory and as such may include random access memory (SRAM, DRAM, and/or other types of RAM), flash memory, secure digital (SD) memory, registers, compact discs, digital versatile discs (DVD), and/or other types of nontransitory computer readable mediums. Depending on the particular embodiments, these nontransitory computer readable mediums may reside within the onboard computing device 14 and/or external to the onboard computing device 14.

The local interface 56 is implemented as a bus or other communication interface to facilitate communication among the components of the electronic control unit 24.

The GPS 58 is used in conjunction with the processor 28 to determine the area in which the vehicle 12 is located. The input/output hardware 60 may include or be configured to interface with the various other components of the vehicle 12. As an example, the input/output hardware 60 may interface with the external temperature sensor 36, the internal temperature sensor 38, the drive system temperature sensor 42, the environmental condition sensors 44, sun load sensors 46, and imaging device 52, as shown in FIGS. 2 and 3.

The network interface hardware 62 may include or be configured to interface with the transceiver 26 to connect to the network 22. As an example, the network interface hardware 62 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication is made through the transceiver 26 using the network interface hardware 62 thereby facilitating communication between the electronic control unit 24, the mobile computing device 16, the administrator computing device 18, and the weather data service 20 through the network 22.

It should be understood that while the components of FIG. 4 are illustrated as residing within the electronic control unit 24, this is merely an example thereof. In some embodiments, one or more of the components may reside external to the electronic control unit 24. It should also be understood that while the electronic control unit 24 is illustrated as a single device, this is also merely an example. In some embodiments, the detection logic 30a, the temperature estimation logic 30b, and the communication logic 30c may reside on different computing devices. As an example thereof, one or more of the functionalities and/or components described herein may be provided by the mobile computing device 16, the administrator computing device 18, which may be coupled to the vehicle 12 via the network 22.

The temperature map data 66 includes pre-stored temperature maps that correlate the effects of local weather forecasts on the vehicle temperature and the vehicle thermal energy generation by the drive system 40 and the operation of the HVAC system 34 based on a runtime of the drive system 40 and the HVAC system 34. The environmental conditions data 68 includes pre-stored data on the environmental conditions that correlates the effects of the environmental conditions exposed to the vehicle 12 to correct the estimated future temperature. The environmental conditions data 68 includes the effects of the amount of sun light and the amount of precipitation from the environmental conditions sensors 44 that is exposed to the vehicle 12. The data, algorithms, and/or logic used in the temperature map data 66 and the environmental conditions data 68 are found through experimentation.

Figure 5A:
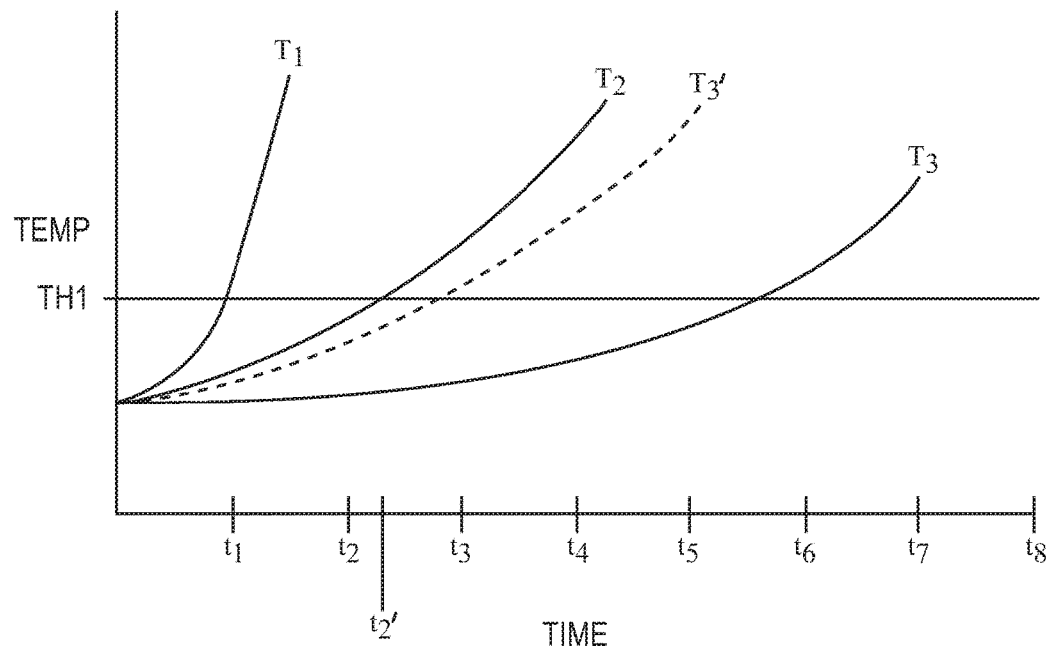
FIG. 5A depicts a pre-stored map used to estimate a future temperature and determine whether the estimated future temperature exceeds an upper threshold of a predetermined temperature range, according to one or more embodiments described herein.
Figure 5B:
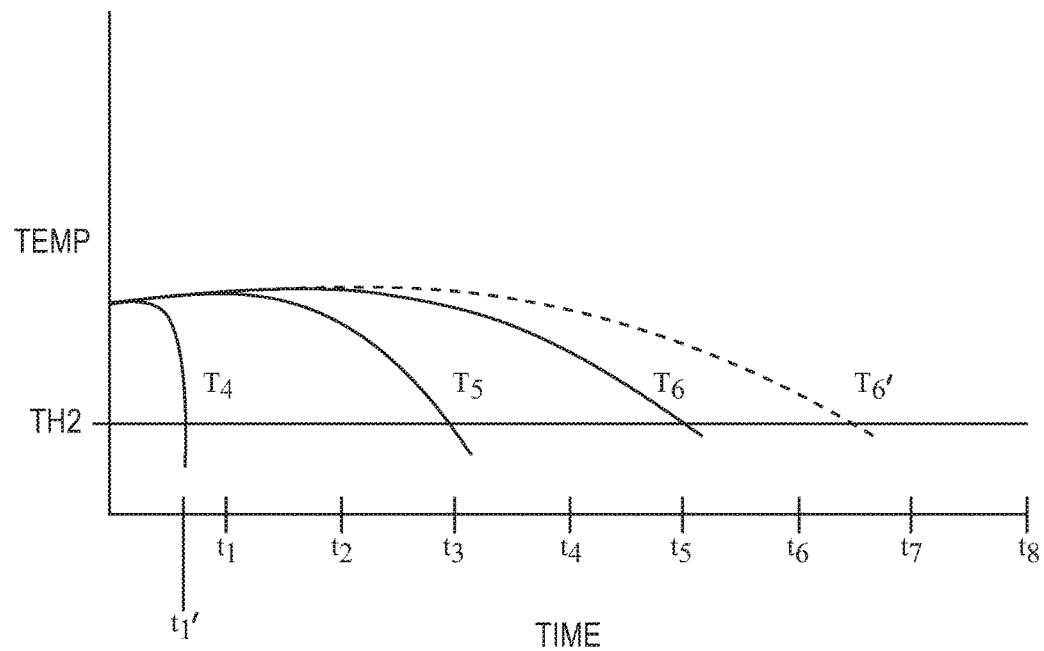
FIG. 5B depicts a pre-stored map used to estimate a future temperature and determine whether the estimated future temperature will fall below a lower limit threshold of a predetermined temperature range, according to one or more embodiments described herein.

With reference to FIGS. 5A and 5B, the estimation of a future temperature of the passenger compartment 32 based upon the local weather forecast will now be discussed. FIGS. 5A and 5B schematically illustrate temperature maps pre-stored in the temperature map data 66 and environmental conditions data 68 pre-stored in the environmental conditions data 68. The temperature map data 66 correlates the runtime of the remote start system with the local weather forecast, the vehicle thermal energy generation by the drive system 40, and the operation of the HVAC system 34 to estimate the future temperature after the lapse of the predetermined runtime.

The temperature maps of FIG. 5A and FIG. 5B are used to estimate a future temperature of the passenger compartment 32 of a vehicle 12 based upon the weather forecast, the vehicle thermal energy generation by the drive system 40 and the operation of the HVAC system 34. Specifically, processor 28 executes the temperature estimation logic 30b using the temperature map data 66 and the retrieved local weather forecast to estimate a future temperature at a lapse of a predetermined runtime.

The local weather forecast is mapped onto the temperature maps stored in the temperature map data 66. Specifically, the temperature estimation logic 30b is executed by the processor 28 to estimate a future temperature of the vehicle 12. In some embodiments, the future temperature of the vehicle is a temperature of the drive system 40 after the lapse of the predetermined runtime.

As shown in FIGS. 5A and 5B, various estimated future temperatures T1-T3 and T4-T6, respectively, are estimated based on the vehicle temperature and various different local weather forecasts. The estimated future temperatures are provided at a plurality of predetermined runtimes so as to estimate a future temperature of the passenger compartment 32 at various points in the future.

As shown in FIG. 5A, an upper temperature threshold TH1 is provided as an upper limit of a predetermined temperature range. Similarly, as shown in FIG. 5B, a lower temperature threshold TH2 is provided as a lower limit of the predetermined temperature range. The predetermined temperature range is a temperature range that provides suitable temperatures for the vehicle 12.

The upper limit of the predetermined temperature range, is a temperature that, once exceeded is a warm condition of the vehicle 12 during cold weather conditions. The lower limit of the predetermined temperature range, is a temperature that once below is a cool condition of the vehicle 12 during warm weather conditions. The upper and lower limits of the predetermined temperature range are determined in advance and stored in the temperature map data 66. In some embodiments, the upper limit of the predetermined temperature range is $80°^F \pm 5°^F$. In some embodiments, the lower limit of the predetermined temperature range is $60°^F \pm 5°^F$. In still some other embodiments, the upper and lower limits of the predetermined temperature range are selected by the user, such as a driver.

The estimated future temperatures T1-T3 and T4-T6 are then corrected to take into account environmental conditions based on the output of the environmental condition sensors 44 using the environmental conditions data 68. The temperature estimation logic 30b is executed by the processor 28 to correlate the effects of the amount of sun light received by the vehicle 12 and the amount of perception that is exposed to the vehicle 12 to correct the estimated future temperatures T1-T3 and T4-T6. The amount or presence/absence of sun light or precipitation received by the vehicle 12 based on outputs from the environmental condition sensors 44. The effect of the amount or presence/absence of sun light or precipitation on the estimated temperatures T1-T3 and T4-T6 are determined using the environmental conditions data 68.

As shown in FIG. 5A, the processor 28 executes the temperature estimation logic 30b using the temperature map data 66 and the retrieved local weather forecast to estimate a future temperature T1 that exceeds the upper threshold limit prior to the lapse of a predetermined runtime $t_1$. As the future estimated temperature exceeds the upper temperature threshold TH1 prior to the lapse of the predetermined runtime $t_1$, the system 10 does not provide the user an option to extend the predetermined runtime.

As an alternative example, the estimated future temperature T2 is based on a particular weather forecast that indicates that the estimated temperature T2 will not exceed the upper temperature threshold TH1 prior to the lapse of the predetermined runtime $t_1$. However, it is estimated that the estimated future temperature T2 would exceed the upper temperature threshold TH1 by an extended predetermined runtime $t_3$. Therefore, the system 10 would provide the user an option to extend the predetermined runtime $t_1$ to the extended runtime $t_3$ upon activation of the remote start request.

The extended predetermined runtime $t_3$ is a preset amount of time from the expiration of the predetermined runtime $t_1$. Specifically, the extended runtime $t_2$ is the predetermined runtime $t_1$ extended by 5 minutes and the extended runtime $t_3$ is the predetermined runtime $t_1$ extended by 10 minutes.

In addition, the processor 28 also estimates that the estimated future temperature would exceed the upper threshold limit TH1 at an estimated runtime $t_2'$ which is not equal to extending the predetermined runtime $t_1$ by a preset amount of time. However, the system 10 optionally provides the user an option to shorten the predetermined runtime $t_1$ to the estimated runtime $t_2'$ upon activation of the remote start request.

As a further alternative example, the estimated future temperature T3 is based on another particular weather forecast that indicates a high level of cloud cover with low levels of sunlight. As such, it is determined that the estimated future temperature T3 will exceed the upper temperature threshold TH1 until after extended predetermined runtime $t_5$. However, based upon output of the environmental condition sensors 44, it is determined that the vehicle 12 is in an area receiving a larger amount of direct sunlight than indicated by the another particular weather forecast. For example, the environmental condition sensors 44, operating as sun load sensors, indicate that the vehicle 12 is provided in an open area receiving a high level of direct sunshine. As such, the temperature estimation logic 30b executed by the processor 28 corrects the estimated future temperature T3 using the output of the environmental condition sensors 44 and the environmental conditions data 68 to output a corrected estimated future temperature T3'. As shown in FIG. 5A, the corrected estimated future temperature T3' will exceed the upper temperature threshold TH1 prior to the extended predetermined runtime $t_3$. As such, the system 10 would provide the user an option to extend the predetermined runtime $t_1$ to the extended runtime $t_3$ rather than the extended predetermined runtime $t_5$.

As shown in FIG. 5B, the processor 28 executes the temperature estimation logic 30b using the temperature map data 66 and the retrieved local weather forecast to estimate a future temperature T4 at a lapse of a predetermined runtime $t_1$. As the future estimated temperature falls below the lower temperature threshold TH2 prior to the lapse of the predetermined runtime $t_1$, the system 10 does not provide the user an option to extend the predetermined runtime.

In addition, the processor 28 also estimates that the estimated future temperature would exceed the lower threshold limit TH2 at an estimated runtime t1' which is not equal to shortening the predetermined runtime $t_1$ by a preset amount of time. However, the system 10 optionally provides the user an option to shorten the predetermined runtime $t_1$ to the estimated runtime $t_1'$ upon activation of the remote start request.

As an alternative example, the estimated future temperature T5 is based on a particular weather forecast that indicates that the estimated temperature T5 will not fall below the lower threshold temperature threshold TH2 prior to the lapse of the predetermined runtime $t_1$. However, it is estimated that the estimated future temperature T2 would fall below the lower temperature threshold TH2 until the extended predetermined runtime $t_3$. Therefore, the system 10 would provide the user an option to extend the predetermined runtime $t_1$ to the extended runtime $t_3$ upon activation of the remote start request.

As a further alternative example, the estimated future temperature T6 is based on a particular weather forecast indicates that a low chance of precipitation, the estimated temperature T6 will not fall below the lower temperature threshold TH2 until the extended predetermined runtime $t_5$. However, based upon the output of the environmental condition sensors 44, operating as a rain sensor, it is determined that the vehicle 12 is in an area receiving a larger amount of precipitation than indicated by the particular weather forecast. As such, the temperature estimation logic 30b executed by the processor 28 corrects the estimated future temperature T6 using the output of the environmental condition sensors 44 and the environmental conditions data 68 to output a corrected estimated future temperature T6'. As shown in FIG. 5B, the corrected estimated future temperature T6' will not fall below the lower temperature threshold TH2 until after extended predetermined runtime $t_6$. As such, the system 10 would provide the user an option to extend the predetermined runtime $t_1$ to the extended runtime t7 rather than the extended predetermined runtime $t_5$.

Figure 6B:
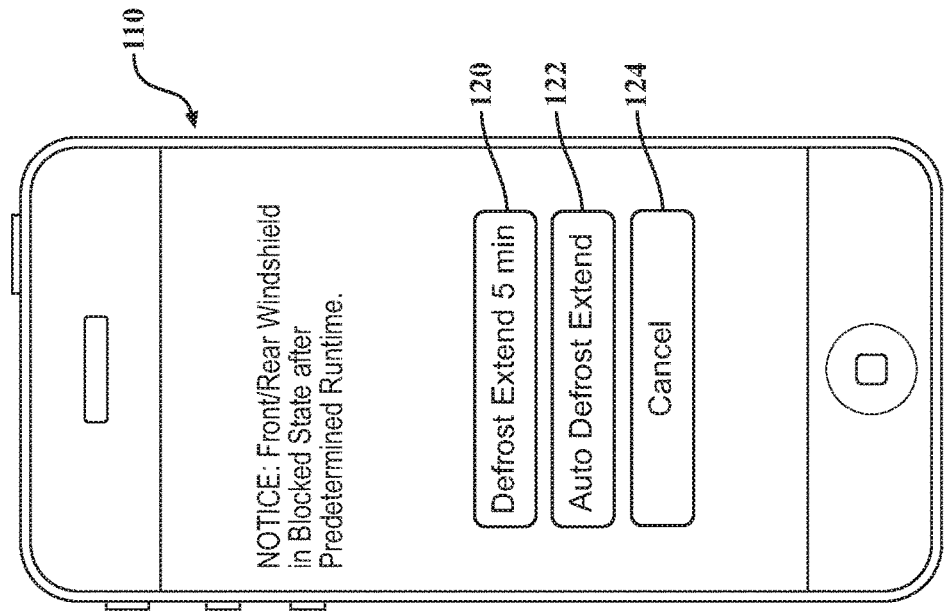
FIG. 6B schematically depicts a user interface of a computing device that provides options to the user to vary a predetermined runtime of the drive system.
Figure 6A:
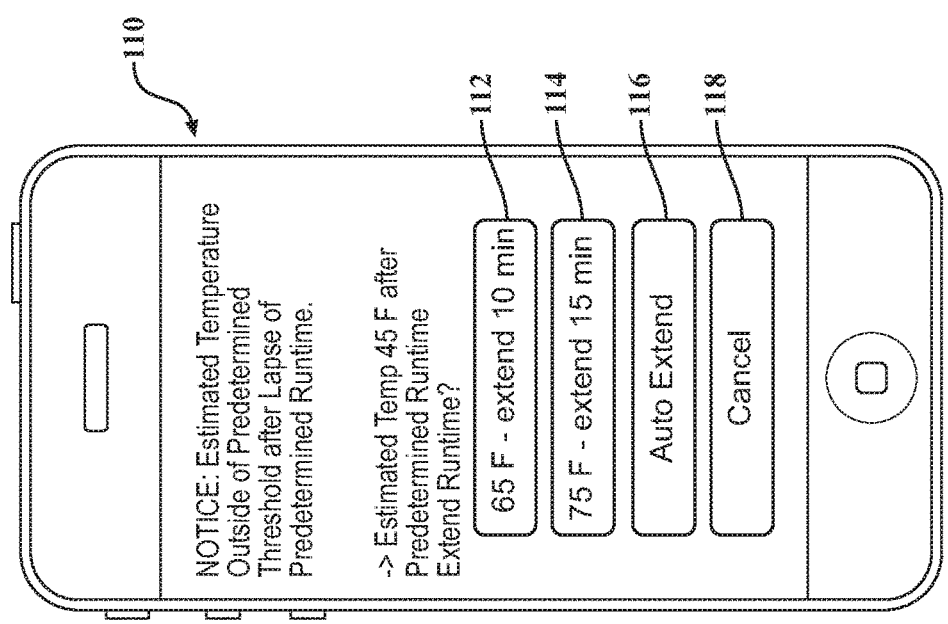
FIG. 6A schematically depicts a user interface of a computing device that provides a notice to a user about a temperature condition after a lapse of a predetermined runtime of a drive system based upon an estimated future temperature, according to one or more embodiments described herein.

With reference to FIGS. 6A and 6B, a user interface 110 on a display device of at least one of the mobile computing device 16 and the administrator computing device 18 is provided. The user interface 110 provides a notice to the user about a temperature condition based upon estimated future temperature according to the embodiments disclosed herein. As discussed above, some embodiments may be configured to notify the user such as a driver through the mobile computing device 16 and/or an administrator computing device 18. Accordingly, the user interface 110 provides the user the estimated future temperature of the passenger compartment 32 based on a plurality of predetermined runtimes.

As illustrated in FIG. 6A, the user interface 110 may include a notice of the temperature condition based upon the estimated temperature after a remote start request is sent. Specifically, the user interface 110 provides a notice that the estimated future temperature is outside of the predetermined temperature range after the lapse of the predetermined runtime. Further, the user interface 110 provides an estimated future temperature after the lapse of a plurality of predetermined runtimes.

In some embodiments, the user interface 110 provides an option to the user to modify, by extending or shortening, the predetermined runtime to one of the plurality of predetermined runtimes. As shown in FIG. 6A, the user interface 110 includes options 112 and 114 to extend the predetermined runtime to one of the plurality of predetermined runtimes. The options 112 and 114 provides the user with the estimated future temperature after the lapse of the plurality of predetermined runtimes.

The user interface 110 further includes an auto extend option 116 and a cancel option 118. The auto extend option 116 provides the user with an option to extend the predetermined runtime to the estimated predetermined runtime which is the time until the future estimated temperature is within the predetermined temperature range. The cancel option 118 cancels the remote start prior to the lapse of the predetermined runtime.

It is appreciated, of course, that options 112 and 114 optionally include an option to shorten the predetermined runtime if the estimated future temperature would be within the predetermined temperature range prior to the lapse of the predetermined runtime.

In response to the processor 28 determining that the front windshield 48 or the rear windshield 50 as being in a blocked state, the user interface 110 provides options to extend the predetermined runtime to allow for additional time to defrost the front windshield 48 or the rear windshield 50.

With reference to FIG. 6B, the user interface 110 optionally provides an option to extend the predetermined runtime even if the estimated future temperature is within the predetermined temperature range before the lapse of the predetermined runtime. Specifically, the user interface 110 provides options to extend the predetermined runtime to allow for additional time to defrost the front windshield 48 or the rear windshield 50 based on the blockage sensor. Upon lapse of the predetermined runtime, the processor 28 compares the output signal of the blockage sensor to a predetermined value to determine the state of blockage of the front windshield 48 or the rear windshield 50. When the output signal of the blockage sensor is equal to or greater than the predetermined value, the processor 28 determines that state of blockage of the front windshield 48 or the rear windshield 50 as being in an unblocked state. However, when the output signal of the blockage sensor is less than the predetermined value, the processor 28 determines that state of blockage of the front windshield 48 or the rear windshield 50 as being in a blocked state.

Alternatively, the processor 28 determines that the front windshield 48 or the rear windshield 50 as being in a blocked state at a preset time before the lapse of the predetermined runtime. At the lapse of the predetermined time, the drive system 40 will shutdown and stop operating, and the selection of the option to extend the predetermined runtime to allow for additional time to defrost the front windshield 48 or the rear windshield 50 will restart the drive system 40. As another alternative, the option to extend the predetermined runtime is sent at a preset time prior to or at the lapse of the predetermined runtime and drive system 40 is kept operating even after the lapse of the predetermined runtime until an option is selected by the user.

The user interface 110 depicted in FIG. 6B, includes a defrost extend option 120, an auto defrost option 122, and a cancel option 124 when it is determined that the front windshield 48 and/or the rear windshield 50 are in the blocked state. The defrost extend option 120 extends the predetermined runtime for an additional preset amount of time or an amount of time selected by the user. In addition, the user interface 110 optionally identifies whether it is the front windshield 48, the rear windshield 50, or both the front windshield 48 and the rear windshield 50 that are in the blocked state.

The auto extend option 122 provides the user with an option to extend the predetermined runtime until it is determined based on the blockage sensor that the state of blockage of the front windshield 48 and/or the rear windshield 50 is in the unblocked state. The cancel option 124 cancels the remote start of the drive system 40 without extending the predetermined runtime to defrost the front windshield 48 and/or the rear windshield 50.

In some embodiments, the blockage sensor is the sun load sensors 46 which detects an amount of light entering through the front windshield 48 and/or the rear windshield 50. The sun load sensors 46 output a signal indicating a blockage amount of the front windshield 48 and/or the rear windshield 50. As discussed above, the processor 28 executes logic to compare the output of the sun load sensors 46 to a predetermined value to determine a state of blockage of the front windshield 48 and/or the rear windshield 50.

In some embodiments, the weather data from the weather data service 20 includes sunrise and sunset times. The processor 28 executes logic to compare the sunrise and sunset times to the current time to determine whether it is day or night. In some embodiments, the processor 28 omits the blockage determination when it is determined that it is night. In some other embodiments, the predetermined value to which the output value of the sun load sensors 46 and/or the imaging device 52, operating as blockage sensors, is lowered during the night compared to the predetermined value during the day.

In some embodiments, the blockage sensor is the imaging device 52 which captures an image of the front windshield 48 and/or the rear windshield 50. The image indicates a blockage amount of the front windshield 48 and/or the rear windshield 50. Upon lapse of the predetermined runtime, the processor 28 executes an imaging analysis logic stored within the memory component 30. The imaging analysis logic analyses the image to compare the image with a predetermined value to determine a state of blockage of the windshield the front windshield 48 and/or the rear windshield 50. The imaging analysis logic optional determines a percentage of the font windshield 48 and/or the rear windshield 50 that is blocked and compares the determined percentage with a predetermined percentage to determine the state of blockage of the front windshield 48 and/or the rear windshield 50.

Figure 7:
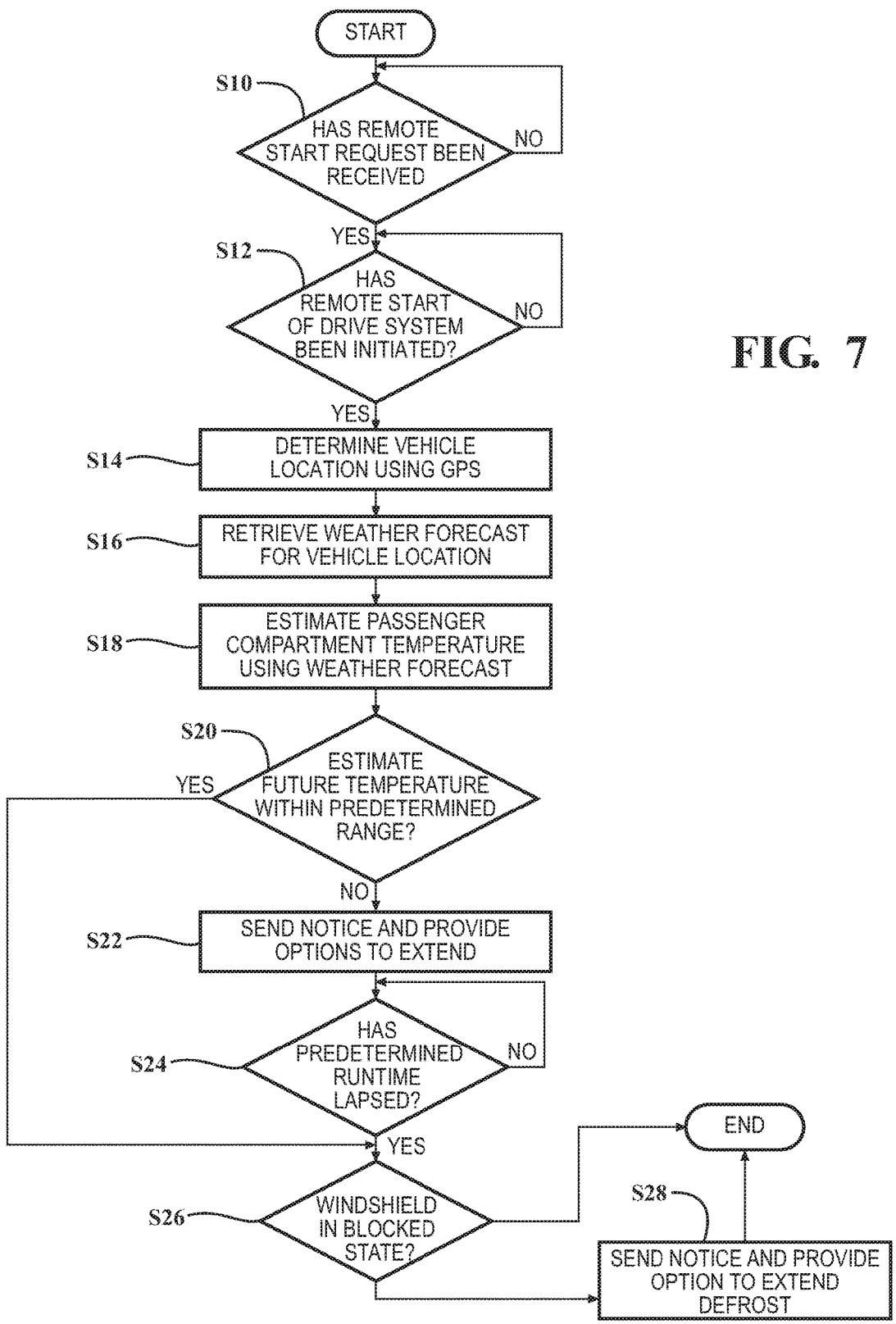
FIG. 7 depicts a flowchart for facilitating a notifying a user about a temperature condition after a lapse of a predetermined runtime of the drive system based on an estimated future temperature, according to one or more embodiments shown and described herein.

FIG. 7 depicts a flowchart for facilitating notifying to a user based upon estimated temperature according to the embodiments disclosed herein. The flowchart depicted in FIG. 7 is executed by the logic stored in the memory component 30 that is executed by the processor 28 in the electronic control unit 24. The process of the flowchart in FIG. 7 is executed at various predetermined time periods.

In step S10 of FIG. 7, a determination is made whether a user has initiated a remote start request of the drive system 40 of the vehicle 12 has been received. Specifically, the transceiver 26 operates to determine whether remote start request of the drive system 40 of the vehicle 12 has been received from the mobile computing device 16 or the administrator computing device 18. Upon a NO determination in step S10, the process returns to repeat step S10. Upon a YES determination in step S10 that a remote start request of the drive system 40 of the vehicle 12 has been made, the process proceeds to step S12.

In step S12, a determination is made regarding whether the remote start of the drive system 40 has been initiated. Specifically, the electronic control unit 24 controls the drive system 40 to start operation and then determines whether the drive system 40 has been remotely started.

Upon a NO determination in step S12, the process repeatedly executes step S12. On the other hand, upon a YES determination in step S12, the process proceeds to step S14 in which a determination of the area in which the vehicle 12 is located is made using the GPS 58. The GPS 58 cooperates with the processor 28 of the electronic control unit 24 to determine a longitude and latitude of the vehicle 12. Utilizing the longitude and latitude of the vehicle 12, the processor 28 determines an area in which the vehicle 12 is located based on map data stored in the GPS 58. In some embodiment, the area in which the vehicle is located is a zip code in which the vehicle 12 is located or a name of a city, town, or county in which the vehicle 12 is located.

Upon determining the area in which the vehicle 12 is located in step S14, the process proceeds to step S16. In step S16, a weather forecast for the area in which the vehicle 12 is located is retrieved. In some embodiments, the processor 28 executes the communication logic 30c to communicate with the weather data service 20 through the network 22 using the network interface hardware 62, such as the transceiver 26. The weather data service 20 is optionally a government service, a free service, or a pay service. In some embodiments, the weather data service 20 is the National Weather Service (NWS), the National Digital Forecast Database, WeatherData Services, Inc, or AccuWeather. The weather data service 20 provides a weather forecast in response to the provided area in which the vehicle 12 is located.

Upon retrieving weather forecast for the area in which the vehicle 12 is located in step S16, the process proceeds to step S18. In step S18, a plurality of future temperatures of the passenger compartment 32 are estimated using the retrieved weather forecast, the external temperature from the external temperature sensor 36, the internal temperature from the internal temperature sensor 38, the drive system temperature from the drive system temperature sensor 42, data from the HVAC system 34, and the temperature map data 66. Specifically, a future temperature is estimated as a temperature of the passenger compartment 32 at a lapse of a plurality of predetermined runtimes. Further, the output from at least one of the external temperature sensor 36, the internal temperature sensor 38, and the drive system temperature sensor 42, and the output from the environmental condition sensors 44, the retrieved weather forecast, the temperature map data 66, and the environmental conditions data 68 are used by the processor 28 when executing the temperature estimation logic 30b to correct the estimated temperature, as described above. Specifically, the estimated future temperature is corrected based upon the detected environmental conditions from the environmental condition sensors 44 deviating from the retrieved weather forecast.

The process proceeds to the determination step of S20 in which it is determined whether the estimated future temperature is within the predetermined temperature range for the plurality of predetermined runtimes. Upon a NO determination in step S20, the process proceeds to execute step S22. On the other hand, upon a YES determination, the process proceeds to execute step S26.

In step S22, a notice is sent to the user about the temperature condition at the lapse of the predetermined runtime. The notice is sent to the user via to the mobile computing device 16 and/or the administrator computing device 18. The notice is displayed on the user interface 110 of the mobile computing device 16 or the administrator computing device 18. Specifically, the mobile computing device 16 and/or the administrator computing device 18 operates as the computing device to receive the notice indicating the temperature of the passenger compartment 32 will be outside the predetermined temperature range after the lapse of the predetermined runtime. As discussed above, the notice provided in step S22 includes options for extending the predetermined runtime which if selected by the user are executed in step S22.

The process proceeds to the determination step of S24 in which it is determined whether the predetermined runtime, which may have been optionally extended in step S22, has lapsed. Upon a NO determination in step S24, the process proceeds to repeat step S24. On the other hand, upon a YES determination, the process proceeds to step S26.

In step S26, a determination is made as to whether the front windshield 48 and/or the rear windshield 50 are in the blocked state. The determination regarding the state of blockage of the front windshield 48 and/or the rear windshield 50 is based on the sun load sensors 46 and/or the imaging device 52 acting as the blockage sensors. Upon a NO determination in step S26, the process ends. On the other hand, upon a YES determination, the process proceeds to step S28.

In step S28, a notice regarding the state of blockage of the front windshield 48 and/or the rear windshield 50 is sent to the user via to the mobile computing device 16 and/or the administrator computing device 18. As discussed above, the notice provided in step S28 includes options for extending the predetermined runtime to defrost the front windshield 48 and/or the rear windshield 50 which if selected by the user are executed in step S28. Upon executing step S28, the process ends.

As illustrated above, various embodiments for systems and methods for providing a notice to a user of a temperature condition after a lapse of a predetermined runtime based on an estimated temperature in the passenger compartment are disclosed herein. Accordingly, the embodiments disclosed herein may provide a user, such as a driver or authority service, with a notice that upon lapse of a predetermined runtime from a remote start, the future temperature of the passenger compartment of the vehicle will be outside a predetermined temperature range. The future temperature is estimated based on local weather forecasts for the area in which the vehicle is located, sensor input and temperature map data. Additionally, embodiments may be configured to provide the user with options to modify the predetermined runtime to allow the temperature of the passenger compartment of the vehicle to reach the predetermined temperature range. Some embodiments may be configured to provide a notice that after the lapse of the predetermined runtime the windshield is in a state of blockage and provide options to extend the predetermined runtime to allow for the defrosting of the windshield.

While temperature estimation is described primarily above, the systems and method described herein may be suitable to provide notice to user a about other weather conditions. For example, the systems and methods described here may by suitable to provide notice to a user about flooding and/server weather warnings based on local or national severe weather alerts.

It should now be understood that embodiments disclosed herein include systems, methods, and nontransitory computer readable mediums for providing notice to a user of a temperature condition after a lapse of a predetermined runtime. It should also be understood that these embodiments are merely explanatory and are not intended to limit the scope of the disclosure.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. It is therefore intended that the appended claims cover all such changes and modifications that are within the scope of the embodiments shown and described herein.

What is claimed is:

1. A system for notifying a user about a temperature condition of a passenger compartment of a vehicle after a lapse of a remote start of a drive system of the vehicle, the system comprising:
   a computing device that sends a remote start request to the vehicle to start the drive system;
   a transceiver that receives the remote start request and retrieves a weather forecast for an area in which the vehicle is located;
   a temperature sensor that detects a temperature of the vehicle; and
   an electronic control unit including a processor and a memory unit that is coupled to the processor, the memory unit stores logic that, when executed by the processor, causes the electronic control unit to:
   start the drive system of the vehicle for a predetermined runtime upon receipt of the remote start request from the computing device;
   estimate a future temperature of the passenger compartment based on the detected temperature of the vehicle and the retrieved weather forecast for the area in which the vehicle is located, the estimated future temperature of the passenger compartment is a temperature of the passenger compartment after a lapse of the predetermined runtime;
   determine whether the estimated future temperature is outside of a predetermined temperature range; and
   in response to determining that the estimated future temperature is outside of the predetermined temperature range, send a notice to the computing device, the notice indicating the estimated future temperature of the passenger compartment after the lapse of the predetermined runtime.

2. The system of claim 1, wherein the notice to the computing device includes an option to modify the predetermined runtime that the drive system will operate from the receipt of the remote start request.

3. The system of claim 1 further comprising a global positioning system in communication with the electronic control unit,
   wherein the electronic control unit determines the area that the vehicle is located based on an output of the global positioning system and the transceiver retrieves the weather forecast of the area that the vehicle is located from a weather data service in response to the receipt of the remote start request from the computing device.

4. The system of claim 1, wherein temperature maps are pre-stored in the memory unit, and wherein the estimated future temperature of the passenger compartment is determined based on the retrieved weather forecast, the detected temperature of the vehicle, and the temperature maps.

5. The system of claim 1, wherein the predetermined temperature range includes an upper temperature threshold and a lower temperature threshold, and wherein the estimated future temperature is determined to be outside of the predetermined temperature range when the estimated temperature is less than the lower temperature threshold or higher than the upper temperature threshold.

6. The system of claim 1, wherein the estimated future temperature of the passenger compartment is estimated after a lapse of a plurality of predetermined runtimes, wherein the notice to the computing device includes the estimated future temperature of the passenger compartment after the lapse of each of the plurality of predetermined runtimes and an option to modify the predetermined runtime to any one of the plurality of predetermined runtimes.

7. The system of claim 1, wherein the electronic control unit is configured to estimate an estimated runtime required for the estimated future temperature of the passenger compartment to be within the predetermined temperature range, wherein the notice includes an option to modify the predetermined runtime to the estimated runtime.

8. The system of claim 1, wherein the temperature sensor detects at least one of a temperature of the passenger compartment, an external temperature of the vehicle, and a drive system temperature of the drive system.

9. The system of claim 1, further comprising a blockage sensor positioned in the passenger compartment adjacent a windshield of the vehicle, the sensor outputs a signal indicating a blockage amount of the windshield,
   wherein upon lapse of the predetermined runtime, the electronic control unit compares the output signal of the sensor to a predetermined value to determine a state of blockage of the windshield, when the blockage amount detected the blockage sensor is less than the predetermined value the electronic control unit sends a notice to the computing device indicating the state of blockage of the windshield and provides an option to extend the predetermined runtime.

10. The system of claim 9, wherein the blockage sensor is a sun load sensor that detects an amount of light entering the passenger compartment through the windshield.

11. A method for notifying a user about a temperature condition of a passenger compartment of a vehicle after a lapse of a remote start of a drive system of the vehicle, the method comprising:
   determining whether a remote start request from a computing device is received;
   in response to determining that the remote start request has been received, starting the drive system of the vehicle for a predetermined runtime, retrieving a weather forecast for an area in which the vehicle is located;

estimating a future temperature of the passenger compartment based on a vehicle temperature detected by a temperature sensor and the retrieved weather forecast for the area in which the vehicle is located, the future temperature of the passenger compartment is a temperature of the passenger compartment after a lapse of the predetermined runtime;

determining whether the estimated future temperature is outside of a predetermined temperature range; and in response to determining that the estimated future temperature is outside of the predetermined temperature range, displaying a notice on the computing device, the notice displaying the estimated future temperature of the passenger compartment after the lapse of the predetermined runtime.

12. The method of claim 11 further comprising:

providing an electronic control unit including a processor and a memory unit that is coupled to the processor, the memory unit stores logic that, when executed by the processor, causes the electronic control unit to:

estimate the future temperature of the passenger compartment based on the retrieved weather forecast for the area in which the vehicle is located and the vehicle temperature detected by the temperature sensor; and send the notice to the computing device.

13. The method of claim 12, wherein the notice to the computing device includes an option to modify the predetermined runtime that the drive system will operate from the receipt of the remote start request.

14. The method of claim 12 further comprising a global positioning system in communication with the electronic control unit, wherein the electronic control unit determines the area that the vehicle is located based on an output of the global positioning system and the transceiver retrieves the weather forecast of the area that the vehicle is located from a weather data service in response to the receipt of the remote start request from the computing device.

15. The method of claim 12, wherein the electronic control unit is configured to estimate an estimated runtime required for the estimated future temperature of the passenger compartment to be within the predetermined temperature range, wherein the notice includes an option to modify the predetermined runtime to the estimated runtime.

16. The method of claim 12 further comprising a blockage sensor positioned in the passenger compartment adjacent a windshield of the vehicle, the sensor outputs a signal indicating a blockage of the windshield, wherein upon lapse of the predetermined runtime, the electronic control unit compares the output signal of the sensor to a predetermined value and determines a state of blockage of the windshield, when the output signal of the blockage sensor is less than the predetermined value the electronic control unit sends an option to the computing device to extend the predetermined runtime.

17. The method of claim 16, wherein the blockage sensor is a sun load sensor that detects an amount of light entering the passenger compartment through the windshield.

18. The method of claim 11, wherein the temperature sensor detects at least one of a temperature of the passenger compartment and an external temperature of the vehicle.

19. The method of claim 11, wherein the predetermined temperature range includes an upper temperature threshold and a lower temperature threshold, and wherein the estimated future temperature is determined to be outside of the predetermined temperature range when the estimated temperature is less than the lower temperature threshold or higher than the upper temperature threshold.

20. The method of claim 11, wherein the estimated future temperature of the passenger compartment is estimated after a lapse of a plurality of predetermined runtimes, wherein the notice to the computing device includes the estimated future temperature of the passenger compartment after the lapse of each of the plurality of predetermined runtimes and an option to modify the predetermined runtime to any one of the plurality of predetermined runtimes.

* * * * *

UNITED STATES PATENT AND TRADEMARK OFFICE
CERTIFICATE OF CORRECTION

PATENT NO. : 10,093,253 B2
APPLICATION NO. : 15/424151
DATED : October 9, 2018
INVENTOR(S) : Gage et al.

It is certified that error appears in the above-identified patent and that said Letters Patent is hereby corrected as shown below:

In Column 12, Line 60, delete "font windshield" and insert --front windshield--, therefor.

Signed and Sealed this
Twenty-sixth Day of February, 2019

Andrei Iancu
*Director of the United States Patent and Trademark Office*